United States Patent
Lee et al.

(10) Patent No.: US 12,277,326 B2
(45) Date of Patent: Apr. 15, 2025

(54) METHOD AND APPARATUS FOR PERFORMING DATA ACCESS MANAGEMENT OF MEMORY DEVICE IN PREDETERMINED COMMUNICATIONS ARCHITECTURE WITH AID OF UNBALANCED TABLE UPDATE SIZE

(71) Applicant: Silicon Motion, Inc., Hsinchu County (TW)

(72) Inventors: Jie-Hao Lee, Hsinchu County (TW); Keng-Yuan Hsu, Taichung (TW); Po-Cheng Lai, Yunlin County (TW)

(73) Assignee: Silicon Motion, Inc., Hsinchu County (TW)

( * ) Notice: Subject to any disclaimer, the term of this patent is extended or adjusted under 35 U.S.C. 154(b) by 86 days.

(21) Appl. No.: 18/236,407

(22) Filed: Aug. 22, 2023

(65) Prior Publication Data

US 2025/0068336 A1 Feb. 27, 2025

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC .............................. G06F 3/0622; G06F 3/0655
See application file for complete search history.

(56) References Cited

U.S. PATENT DOCUMENTS

| | | | |
|---|---|---|---|
| 2019/0155514 A1* | 5/2019 | Cho | G06F 3/0608 |
| 2019/0220416 A1* | 7/2019 | Jung | G06F 12/1009 |
| 2021/0089223 A1* | 3/2021 | Lin | G06F 3/061 |
| 2022/0171706 A1* | 6/2022 | Cho | G06F 12/0292 |
| 2023/0214320 A1 | 7/2023 | Yang | |
| 2023/0251974 A1 | 8/2023 | Das | |

FOREIGN PATENT DOCUMENTS

| | | |
|---|---|---|
| TW | 202328922 A | 7/2023 |
| TW | 202329126 A | 7/2023 |
| TW | 202331520 A | 8/2023 |

* cited by examiner

*Primary Examiner* — Hosain T Alam
*Assistant Examiner* — Nicholas A. Paperno
(74) *Attorney, Agent, or Firm* — Winston Hsu

(57) ABSTRACT

A method for performing data access management of a memory device in predetermined communications architecture with aid of unbalanced table update size and associated apparatus are provided. The memory device may be arranged to receive a set of first commands, receive a set of first data with a first active block according to the set of first commands, and update a temporary physical-to-logical (P2L) address mapping table corresponding to the first active block, and determine a selected table update size among multiple predetermined table update sizes such as multiple table entry counts and update at least one logical-to-physical address mapping table according to a set of P2L table entries corresponding to the selected table update size in the temporary P2L address mapping table, where the table update size may be dynamically changed for enhancing overall performance.

15 Claims, 10 Drawing Sheets

METHOD AND APPARATUS FOR PERFORMING DATA ACCESS MANAGEMENT OF MEMORY DEVICE IN PREDETERMINED COMMUNICATIONS ARCHITECTURE WITH AID OF UNBALANCED TABLE UPDATE SIZE

BACKGROUND OF THE INVENTION

1. Field of the Invention

The present invention is related to memory control, and more particularly, to a method and apparatus for performing data access management of a memory device in a predetermined communications architecture with aid of unbalanced table update size.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. As some files may be frequently accessed, some data may become invalid data. When the invalid data and some valid data are mixed together at the same storage block within the memory device, it is typically needed to perform garbage collection (GC) to release more storage space for further use. In addition, during accessing of the files, internal management information may change correspondingly, causing processing time of associated processing of the internal management information to be increased. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access management of a memory device in a predetermined communications architecture (e.g., a UFS communications architecture) with aid of unbalanced table update size, in order to solve the above-mentioned problems.

At least one embodiment of the present invention provides a method for performing data access management of a memory device in a predetermined communications architecture with aid of unbalanced table update size, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: utilizing the memory controller to receive a set of first commands from a host device through a transmission interface circuit of the memory controller, receive a set of first data with a first active block among the plurality of blocks according to the set of first commands, and update a temporary physical-to-logical (P2L) address mapping table corresponding to the first active block, wherein the set of first commands indicate that writing the set of first data into the memory device is requested, and the set of first data is written into the first active block; determining a selected table update size among multiple predetermined table update sizes according to at least one predetermined rule, wherein the multiple predetermined table update sizes represent multiple table entry counts, respectively; and updating at least one logical-to-physical (L2P) address mapping table in the NV memory according to a set of P2L table entries corresponding to the selected table update size in the temporary P2L address mapping table, for use of data accessing, wherein a table entry count of the set of P2L table entries is equal to the selected table update size.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform data access management of the memory device in a predetermined communications architecture with aid of unbalanced table update size. The memory controller further comprises a transmission interface circuit, and the transmission interface circuit is arranged to perform communications with the host device. For example, the memory controller receives a set of first commands from the host device through the transmission interface circuit of the memory controller, receives a set of first data with a first active block among the plurality of blocks according to the set of first commands, and updates a temporary physical-to-logical (P2L) address mapping table corresponding to the first active block, wherein the set of first commands indicate that writing the set of first data into the memory device is requested, and the set of first data is written into the first active block; the memory controller determines a selected table update size among multiple predetermined table update sizes according to at least one predetermined rule, wherein the multiple predetermined table update sizes represent multiple table entry counts, respectively; and the memory controller updates at least one logical-to-physical (L2P) address mapping table in the NV memory according to a set of P2L table entries corresponding to the selected table update size in the temporary P2L address mapping table, for use of data accessing, wherein a table entry count of the set of P2L table entries is equal to the selected table update size.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, update an address mapping table in the NV memory according to a temporarily address mapping table in a volatile memory within the memory controller, and dynamically change a table update size according to a plurality of entropy judgment results of a plurality of sets of partial data of the received data, respectively.

The present invention method and apparatus can guarantee that the memory device can operate properly in various situations. For example, the memory device can perform data reception with an active block, manage the active block with the temporarily address mapping table, and update the address mapping table in the NV memory according to the temporarily address mapping table, and more particularly, dynamically change the table update size, to enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
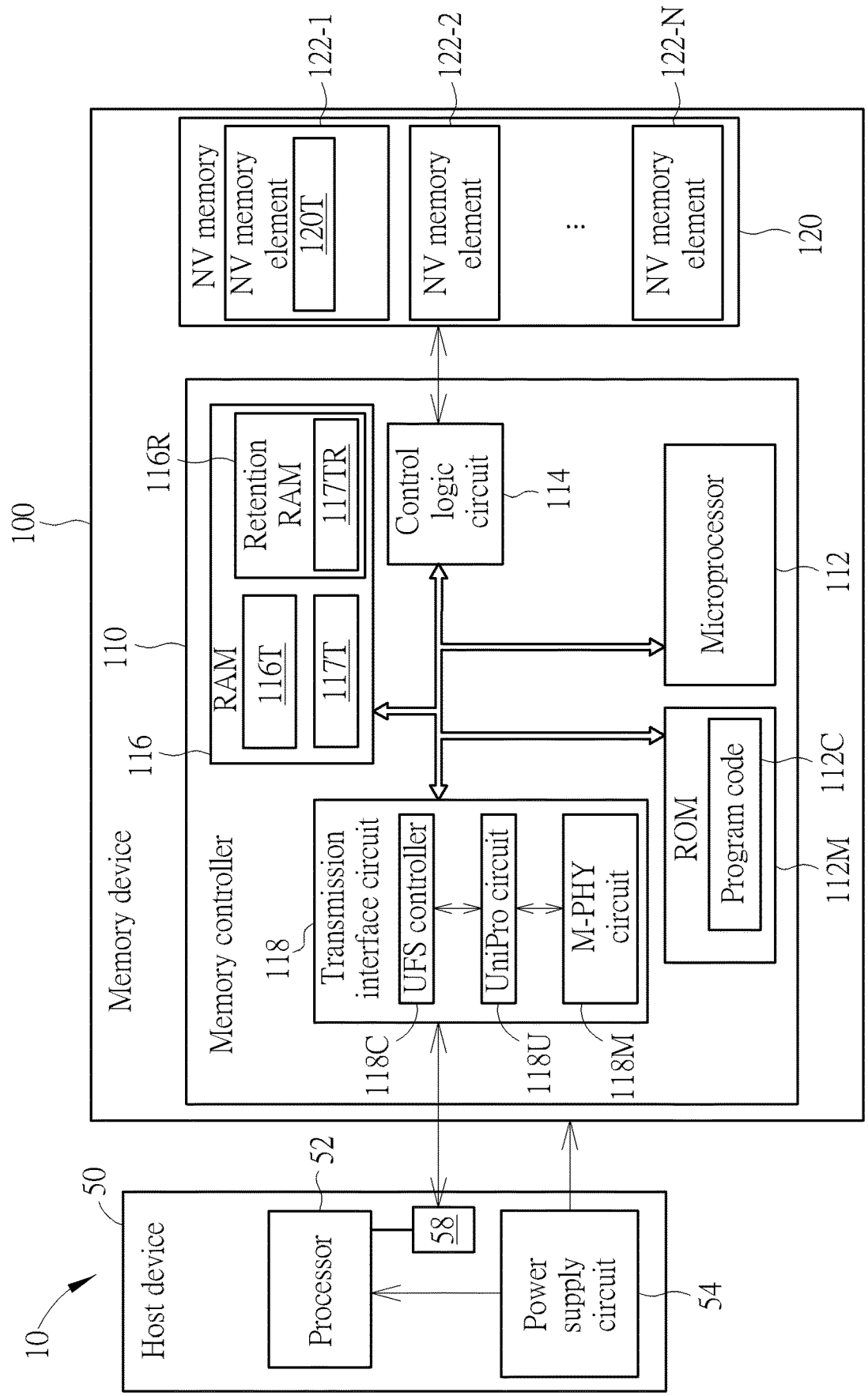
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, ..., and 122-N, where "N" may represent a positive integer that is greater than one. For example, the NV memory 120 may be a flash memory, and the plurality of NV memory elements 122-1, 122-2, ..., and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. For example, the RAM 116 may comprise a retention RAM 116R, and the retention RAM 116R may be implemented as a first memory region (e.g., a retention memory region) that is capable of keeping obtaining power to retain stored data therein when the memory device 100 (or the memory controller 110 therein) is in a power saving state such as a sleep state, but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (or the transmission interface circuit 58 therein) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update at least one physical-to-logical (P2L) address mapping table. For example, the aforementioned at least one P2L address mapping table may comprise a first P2L address mapping table such as a P2L address mapping table 117TR. For another example, the aforementioned at least one P2L address mapping table may comprise a backup P2L address mapping table (not shown in FIG. 1) in the NV memory 120, such as a backup version of the first P2L address mapping table. Additionally, when there is a need, the memory controller 110 may refer to the aforementioned at least one P2L address mapping table to perform some internal management operations such as garbage collection (GC) operations, etc.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, ..., and 122-N, and more particularly, may be stored in the NV memory elements 122-1, 122-2, ..., and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto. For example, the memory controller 110 may load the P2L address mapping table 117TR into a second memory region (e.g., a non-retention memory region) of the RAM 116 to be a temporary P2L address mapping table 117T, in order to expand the first P2L address mapping table from a first size (e.g., the size of M1) of the P2L address mapping table 117TR to a second size (e.g., the size of M2, where M2>M1) of the temporary P2L address mapping table 117T, for performing the internal management operations mentioned above.

As the second memory region (e.g., the non-retention memory region) is positioned outside the first memory region (e.g., the retention memory region), any information in the second memory region may get lost when the memory device 100 (or the memory controller 110 therein) is in the power saving state such as the sleep state. The second memory region (e.g., the non-retention memory region) may comprise multiple sub-regions for temporarily storing various information such as buffered data, the temporary L2P address mapping table 116T, the temporary P2L address mapping table 117T, etc., and at least one portion of sub-regions (e.g., a portion of sub-regions or all sub-regions) among the multiple sub-regions of the second memory region may be regarded as a data buffer. For example, the sub-region for temporarily storing the buffered data may be regarded as the data buffer, but the present invention is not limited thereto. According to some embodiments, the whole of the second memory region (e.g., the non-retention memory region), such as the multiple sub-regions for temporarily storing the buffered data, the temporary L2P address mapping table 116T, the temporary P2L address mapping table 117T, etc., may be regarded as the data buffer.

In addition, the aforementioned at least one NV memory element (e.g., the one or more NV memory elements such as {122-1, 122-2, ..., 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N may comprise multiple blocks, and a block within the multiple blocks may comprise and record a specific number of pages, where the memory controller 110 may access a certain page of a certain block within the multiple blocks according to a block address and a page address.

According to some embodiments, the memory controller 110 may configure at least one block (e.g., one or more blocks) among the plurality of blocks of the aforementioned at least one NV memory element (e.g., the one or more NV memory elements such as {122-1, 122-2, . . . , 122-N}) in the NV memory 120 to be at least one active block (e.g., one or more active blocks) for data buffering and/or data reception, and more particularly, utilize the aforementioned at least one active block to receive data from the host device 50, such as host-write data, for being written into the NV memory 120. For better comprehension, the data such as the host-write data (e.g., the data to be written into the NV memory 120) may comprise a plurality of sets of partial data, and the aforementioned at least one active block may comprise a first active block. During receiving the data such as the host-write data (e.g., the data to be written into the NV memory 120) from the host device 50, the memory controller 110 may utilize the first active block to receive and store one or more sets of partial data among the plurality of sets of partial data according to at least one predetermined rule (e.g., one or more predetermined rules), and generate or update the first P2L address mapping table (e.g., the P2L address mapping table 117TR or the temporary P2L address mapping table 117T, depending on different control schemes) corresponding to the first active block, and more particularly, record P2L table entries in the first P2L address mapping table to indicate P2L address mapping relationships regarding the first active block, for performing subsequent processing, but the present invention is not limited thereto. For example, the P2L address mapping relationships indicated by the P2L table entries may represent the P2L address mapping relationships between the logical addresses at which the one or more sets of partial data are written by the host device 50 and the physical addresses indicating the locations where the one or more sets of partial data are stored in the first active block. When a certain predetermined criterion (e.g., the first active block is fully programmed) is met, the memory controller 110 may perform a set of table processing operations, and the set of table processing operations may comprise:

(1) a first table processing operation: updating the global L2P address mapping table 120T according to the first P2L address mapping table (e.g., the P2L address mapping table 117TR or the temporary P2L address mapping table 117T) corresponding to the first active block, and more particularly, updating some L2P table entries in the global L2P address mapping table 120T according to the P2L table entries in the first P2L address mapping table, for indicating L2P address mapping relationships regarding the first active block;

(2) a second table processing operation: storing the P2L table entries in the temporary P2L address mapping table 117T into the P2L address mapping table 117TR; and (3) a third table processing operation: after performing the first table processing operation (e.g., updating the global L2P address mapping table 120T according to the first P2L address mapping table) and the second table processing operation (e.g., storing the P2L table entries in the temporary P2L address mapping table 117T into the P2L address mapping table 117TR), clearing the temporary P2L address mapping table 117T (or the P2L table entries therein), for reusing the temporary P2L address mapping table 117T and/or the corresponding storage space in the RAM 116;

where the first table processing operation may comprise loading a certain local L2P address mapping table (e.g., the first local L2P address mapping table) within the global L2P address mapping table 120T into the RAM 116 to be the temporary L2P address mapping table 116T, updating one or more L2P table entries in the temporary L2P address mapping table 116T to indicate one or more L2P address mapping relationships among the L2P address mapping relationships regarding the first active block, and updating the global L2P address mapping table 120T (or this local L2P address mapping table therein) according to the temporary L2P address mapping table 116T, but the present invention is not limited thereto. According to some embodiments, the aforementioned certain predetermined criterion may be replaced with any criterion among multiple predetermined criteria, to allow the memory controller 110 to perform the set of table processing operations when the aforementioned any criterion is met. For example, the multiple predetermined criteria may comprise:

(1) the aforementioned certain predetermined criterion: the first active block is fully programmed; and (2) another predetermined criterion: the number of P2L table entries recorded in the first P2L address mapping table reaches a predetermined entry count;

where the predetermined entry count may represent a predetermined table size of the first P2L address mapping table. For example, when the first active block is fully programmed or the number of P2L table entries recorded in the first P2L address mapping table reaches the predetermined entry count, the memory controller 110 may perform the set of table processing operations.

For example, after any active block (e.g., the first active block) among the aforementioned at least one active block is fully programmed, the memory device 100 (or the memory controller 110 therein) may close the aforementioned any active block to make the aforementioned any active block become an inactive block, and select a blank block (e.g., an erased block) to be a replacement of the aforementioned any active block among the multiple active blocks, for performing subsequent data reception corresponding to the aforementioned any active block. In addition, the subsequent processing mentioned above may comprise performing a GC procedure to write valid data among all data in the inactive block into another blank block (e.g., another erased block). According to some embodiments, the aforementioned at least one predetermined rule may vary, and the associated operations may vary correspondingly. For example, the memory controller 110 may copy P2L table entries from the temporary P2L address mapping table 117T to the P2L address mapping table 117TR, to generate or update the P2L address mapping table 117TR according to the temporary P2L address mapping table 117T.

According to some embodiments, as the P2L address mapping relationships indicated by the P2L table entries in the aforementioned at least one P2L address mapping table and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the aforementioned at least one P2L address mapping table. For example, the aforementioned at least one P2L address mapping table may comprise the first P2L address mapping table (e.g., the P2L address mapping table 117TR or the temporary P2L address mapping table 117T). For another example, the aforementioned at least one P2L address mapping table may comprise the backup P2L address mapping table in the NV memory 120. In some examples, the aforementioned at least one P2L address mapping table may comprise the first P2L address mapping table and/or the backup P2L address mapping table in the NV memory 120. In addition, the memory controller 110 may use the plurality of local L2P address mapping tables to manage the relationships between the physical addresses and the logical addresses, such as the physical addresses indicating the locations where the host-write data are stored in the NV memory 120 and the logical addresses at which the host-write data are written by the host device 50. For example, the plurality of local L2P address mapping tables may be implemented as a series of local L2P address mapping tables {L2PT(1), L2PT(2), . . . , L2PT(X)} respectively corresponding to a series of logical address ranges {L_Addr_R(1), L_Addr_R(2), . . . , L_Addr_R(R_CNT)}, and the series of logical address ranges {L_Addr_R(1), L_Addr_R(2), . . . , L_Addr_R(R_CNT)} may be implemented as a series of consecutive ranges of a series of consecutive logical addresses {L_Addr(0), L_Addr(1), . . . , L_Addr((R_CNT*R_Size)−1)}, such as the ranges of the R_CNT intervals [L_Addr(0), L_Addr(R_Size−1)], [L_Addr(R_Size), L_Addr((2*R_Size)−1)], . . . and [L_Addr((R_CNT−1)*R_Size), L_Addr ((R_CNT*R_Size)−1)].

Figure 2:
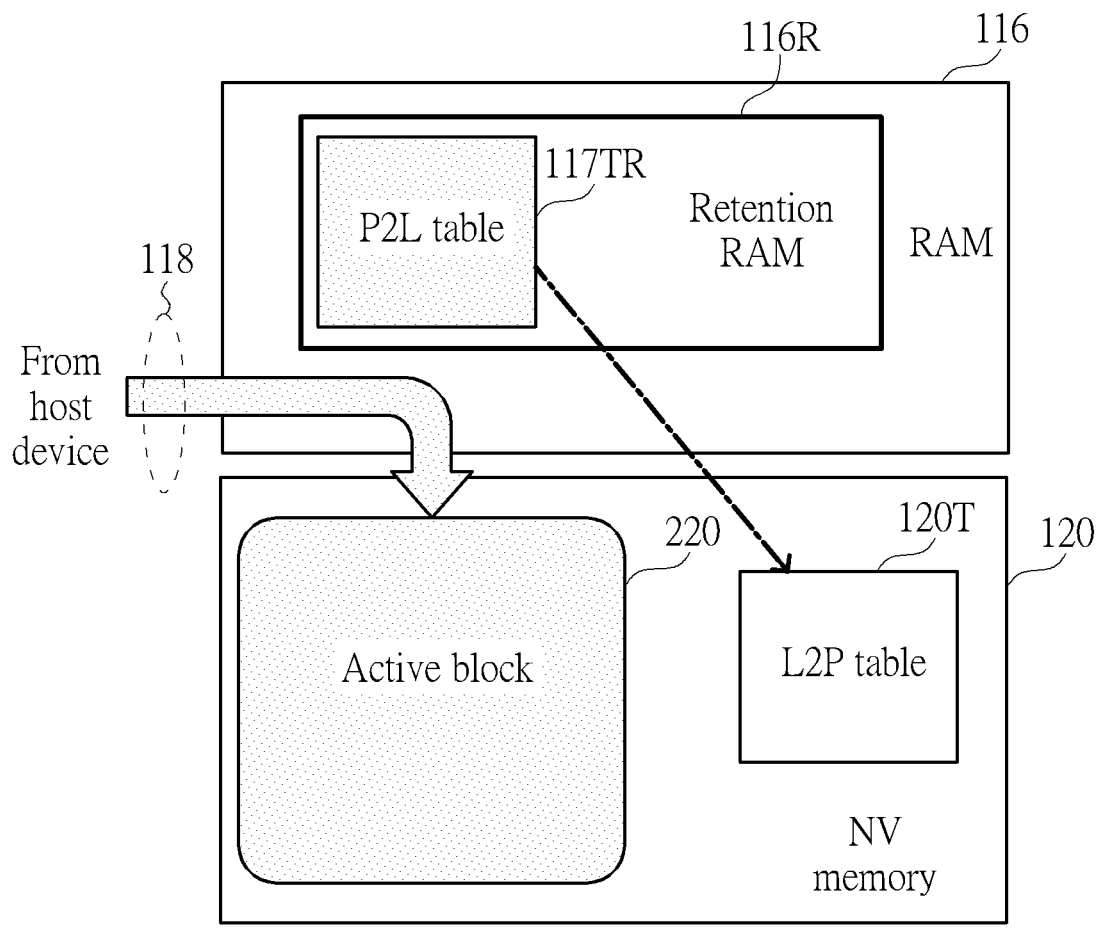
FIG. 2 illustrates a first table update control scheme according to an embodiment of the present invention.

FIG. 2 illustrates a first table update control scheme according to an embodiment of the present invention. For example, the memory controller 110 may utilize the first active block such as the active block 220 to receive the plurality of sets of partial data among the host-write data (e.g., the data to be written into the NV memory 120), and generate or update the first P2L address mapping table corresponding to the active block 220, such as the P2L address mapping table 117TR (labeled "P2L table" for brevity), and more particularly, record P2L table entries in the P2L address mapping table 117TR to indicate P2L address mapping relationships regarding the active block 220. In addition, the memory controller 110 may update the associated L2P table entries in the L2P address mapping table 120T (labeled "L2P table" for brevity) according to the P2L table entries in the P2L address mapping table 117TR in unit of the first size M1, and more particularly, update a set of L2P table entries in the L2P address mapping table 120T according to a set of P2L table entries in the P2L address mapping table 117TR when the P2L address mapping table 117TR is full, where the memory controller 110 may clear the P2L address mapping table 117TR, for example, by removing the set of P2L table entries (e.g., the P2L table entries that have just been used as reference for updating the set of L2P table entries) from the P2L address mapping table 117TR, in order to reuse the P2L address mapping table 117TR, but the present invention is not limited thereto. According to some embodiments, the memory controller 110 may load the P2L table entries from the P2L address mapping table 117TR to the temporary P2L address mapping table 117T, to generate or update the L2P table entries in the L2P address mapping table 120T according to the temporary P2L address mapping table 117T.

FIGS. 3A-3F illustrate a table loading operation, at least one first update operation (e.g., one or more first update operations), another update operation, at least one second update operation (e.g., one or more second update operations), yet another update operation and a table saving operation of a data-entropy-aware table update control scheme of a method for performing data access management of a memory device in a predetermined communications architecture with aid of unbalanced table update size according to an embodiment of the present invention, respectively. For example, the memory controller 110 may utilize the first active block such as the active block 220 to receive the plurality of sets of partial data among the host-write data (e.g., the data to be written into the NV memory 120), and generate or update the first P2L address mapping table corresponding to the active block 220, such as the temporary P2L address mapping table 117T (labeled "P2L table" for brevity), and more particularly, record P2L table entries in the temporary P2L address mapping table 117T to indicate P2L address mapping relationships regarding the active block 220. In addition, the memory controller 110 may update the associated L2P table entries in the L2P address mapping table 120T (labeled "L2P table" for brevity) according to the P2L table entries in the temporary P2L address mapping table 117T in unit of a selected table update size (e.g., the first size M1 or the second size M2) among multiple predetermined table update sizes (e.g., the first size M1 and the second size M2), and more particularly, update a set of L2P table entries in the L2P address mapping table 120T according to a set of P2L table entries in the temporary P2L address mapping table 117T when the P2L entry count of the latest P2L table entries in the temporary P2L address mapping table 117T reaches the selected table update size (e.g., the first size M1 or the second size M2), where the memory controller 110 may clear the temporary P2L address mapping table 117T, for example, by removing the set of P2L table entries (e.g., the P2L table entries that have just been used as reference for updating the set of L2P table entries) from the temporary P2L address mapping table 117T, in order to reuse the temporary P2L address mapping table 117T.

Figure 3A:
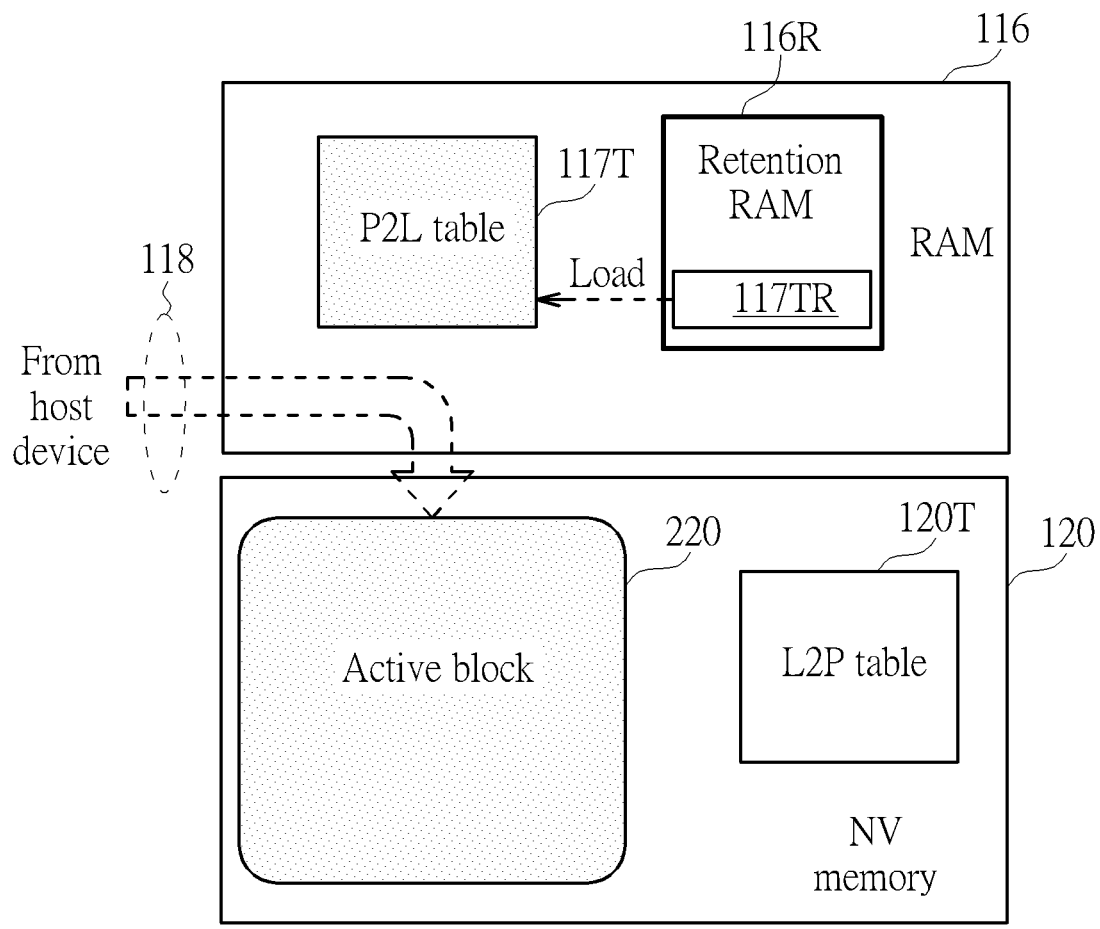
FIG. 3A illustrates a table loading operation of a data-entropy-aware table update control scheme of a method for performing data access management of a memory device in a predetermined communications architecture with aid of unbalanced table update size according to an embodiment of the present invention.

At a first time point, the memory controller 110 may perform the table loading operation as shown in FIG. 3A, and more particularly, load the P2L address mapping table 117TR (e.g., the P2L table entries therein) from the retention RAM 116R to the second memory region (e.g., the non-retention memory region) of the RAM 116 to be the temporary P2L address mapping table 117T (e.g., the P2L table entries therein). For better comprehension, the first time point may represent a time point at which the memory device 100 (or the memory controller 110) wakes up from the power saving state such as the sleep state, where there may be no command (CMD) and no data from the host device 50 at the first time point, but the present invention is not limited thereto.

Figure 3B:
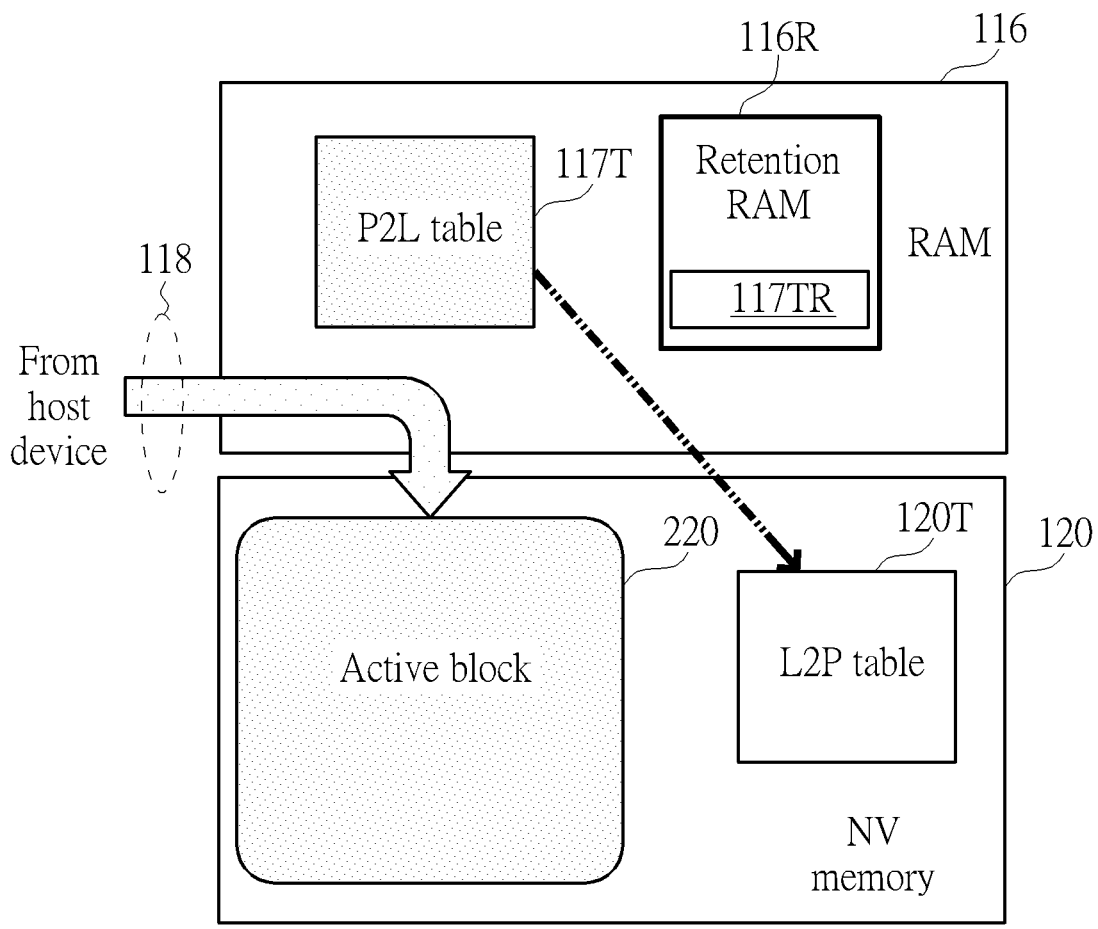
FIG. 3B illustrates at least one first update operation of the data-entropy-aware table update control scheme according to the embodiment shown in FIG. 3A.

In a first time period after the first time point, the memory controller 110 may utilize the active block 220 to receive at least one set of first partial data (e.g., one or more sets of first partial data) with low entropy (labeled "Data with low entropy" in FIG. 3B for brevity) among the plurality of sets of partial data, and update the temporary P2L address mapping table 117T by recording corresponding P2L table entries into the temporary P2L address mapping table 117T, for indicating the P2L address mapping relationships between the logical addresses and the physical addresses of the aforementioned at least one set of first partial data (e.g., the one or more sets of first partial data) in the active block 220. In addition, the memory controller 110 may perform the aforementioned at least one first update operation (e.g., the one or more first update operations) as shown in FIG. 3B, and more particularly, update the associated L2P table entries in the L2P address mapping table 120T (labeled "L2P table" for brevity) according to the P2L table entries in the temporary P2L address mapping table 117T in unit of the selected table update size such as the second size M2 (labeled "M2" for brevity). As the memory controller 110 may continue utilizing the active block 220 to receive the aforementioned at least one set of first partial data and updating the temporary P2L address mapping table 117T correspondingly during the first time period, the P2L entry count of the P2L table entries in the temporary P2L address mapping table 117T may increase correspondingly and reach the selected table update size such as the second size M2. In this situation, the memory controller 110 may perform the aforementioned at least one first update operation as shown in FIG. 3B and clear the temporary P2L address mapping table 117T one or more times, in order to reuse the temporary P2L address mapping table 117T.

Figure 3C:
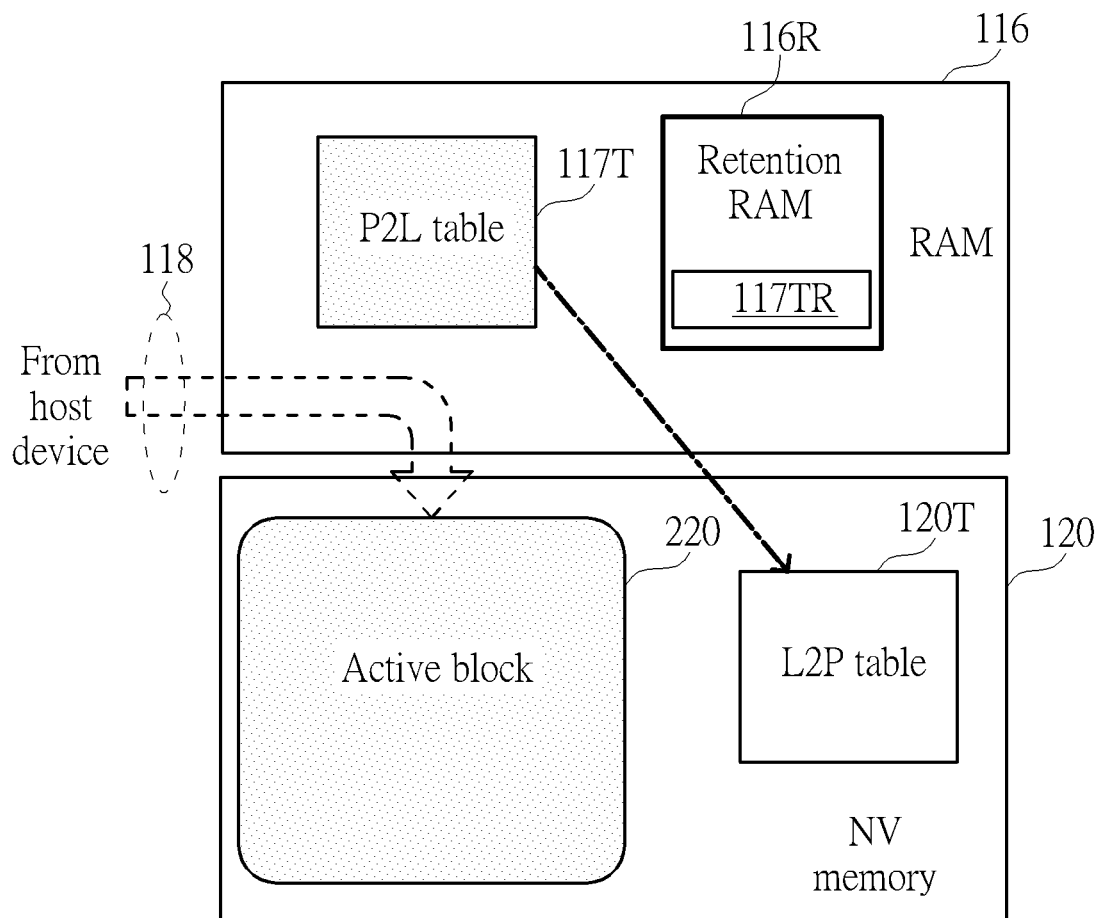
FIG. 3C illustrates another update operation of the data-entropy-aware table update control scheme according to the embodiment shown in FIG. 3A.

At a first subsequent time point after the first time period, there may be no command (CMD) and no data from the host device 50, and the memory controller 110 may perform the other update operation (e.g., the aforementioned another update operation) as shown in FIG. 3C if the P2L entry count of the latest P2L table entries in the temporary P2L address mapping table 117T reaches the first size M1 (labeled "M1" for brevity). At the first subsequent time point, if it is detected that the P2L entry count reaches the first size M1, the memory controller 110 may update the associated L2P table entries in the L2P address mapping table 120T (labeled "L2P table" for brevity) according to the latest P2L table entries in the temporary P2L address mapping table 117T and clear the temporary P2L address mapping table 117T one time, in order to prepare for any possible state transition. For example, it is possible that there is no new command for a time period after the first subsequent time point, and entering the power saving state such as the sleep state may occur later. As the memory controller 110 may have expanded the first P2L address mapping table mentioned above from the first size M1 to the second size M2 (e.g., M2>M1), the memory controller 110 may perform the other update operation (e.g., the aforementioned another update operation) as shown in FIG. 3C to prevent any possible error.

Figure 3D:
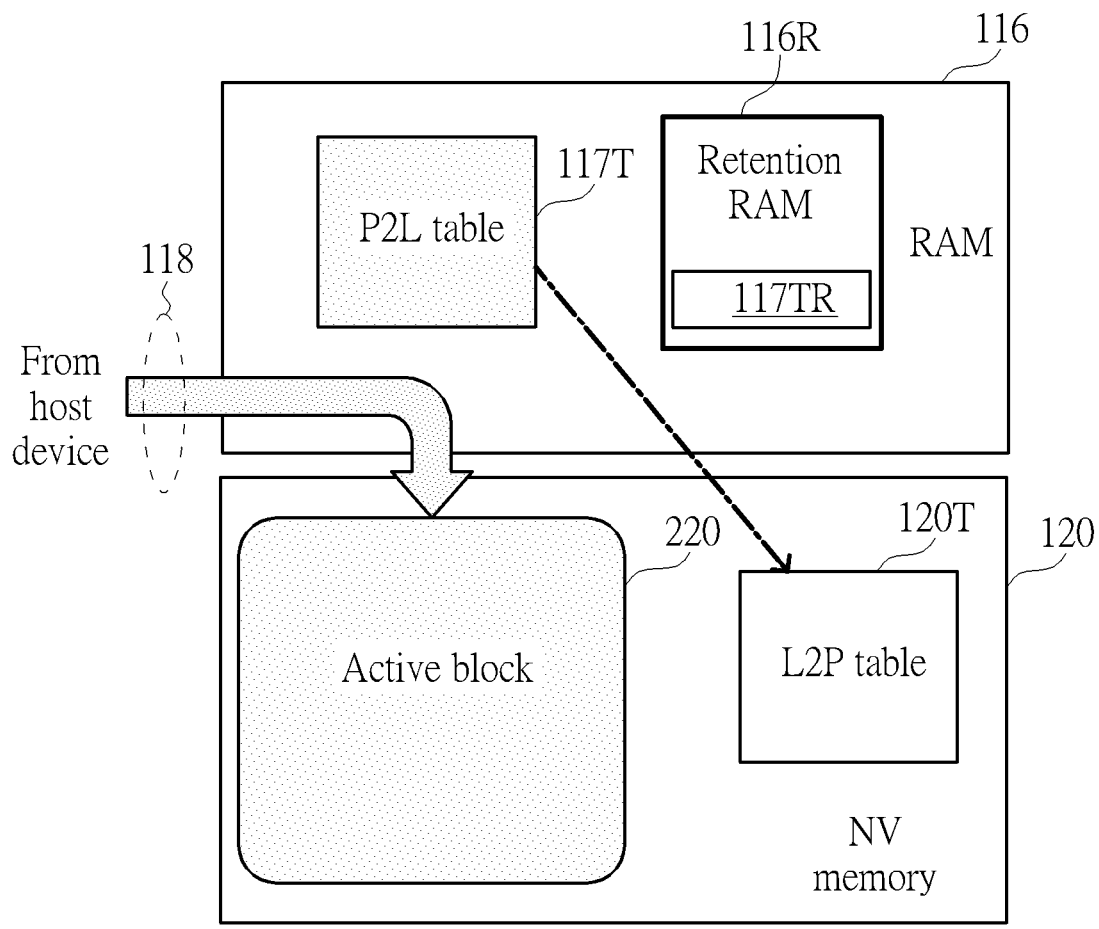
FIG. 3D illustrates at least one second update operation of the data-entropy-aware table update control scheme according to the embodiment shown in FIG. 3A.

In a second time period after the first time point, for example, after the subsequent time point mentioned above, the memory controller 110 may utilize the active block 220 to receive at least one set of second partial data (e.g., one or more sets of second partial data) with high entropy (labeled "Data with high entropy" in FIG. 3D for brevity) among the plurality of sets of partial data, and update the temporary P2L address mapping table 117T by recording corresponding P2L table entries into the temporary P2L address mapping table 117T, for indicating the P2L address mapping relationships between the logical addresses and the physical addresses of the aforementioned at least one set of second partial data (e.g., the one or more sets of second partial data) in the active block 220. In addition, the memory controller 110 may perform the aforementioned at least one second update operation (e.g., the one or more second update operations) as shown in FIG. 3D, and more particularly, update the associated L2P table entries in the L2P address mapping table 120T (labeled "L2P table" for brevity) according to the P2L table entries in the temporary P2L address mapping table 117T in unit of the selected table update size such as the first size M1 (labeled "M1" for brevity). As the memory controller 110 may continue utilizing the active block 220 to receive the aforementioned at least one set of second partial data and updating the temporary P2L address mapping table 117T correspondingly during the second time period, the P2L entry count of the P2L table entries in the temporary P2L address mapping table 117T may increase correspondingly and reach the selected table update size such as the first size M1. In this situation, the memory controller 110 may perform the aforementioned at least one second update operation as shown in FIG. 3D and clear the temporary P2L address mapping table 117T one or more times, in order to reuse the temporary P2L address mapping table 117T.

Figure 3E:
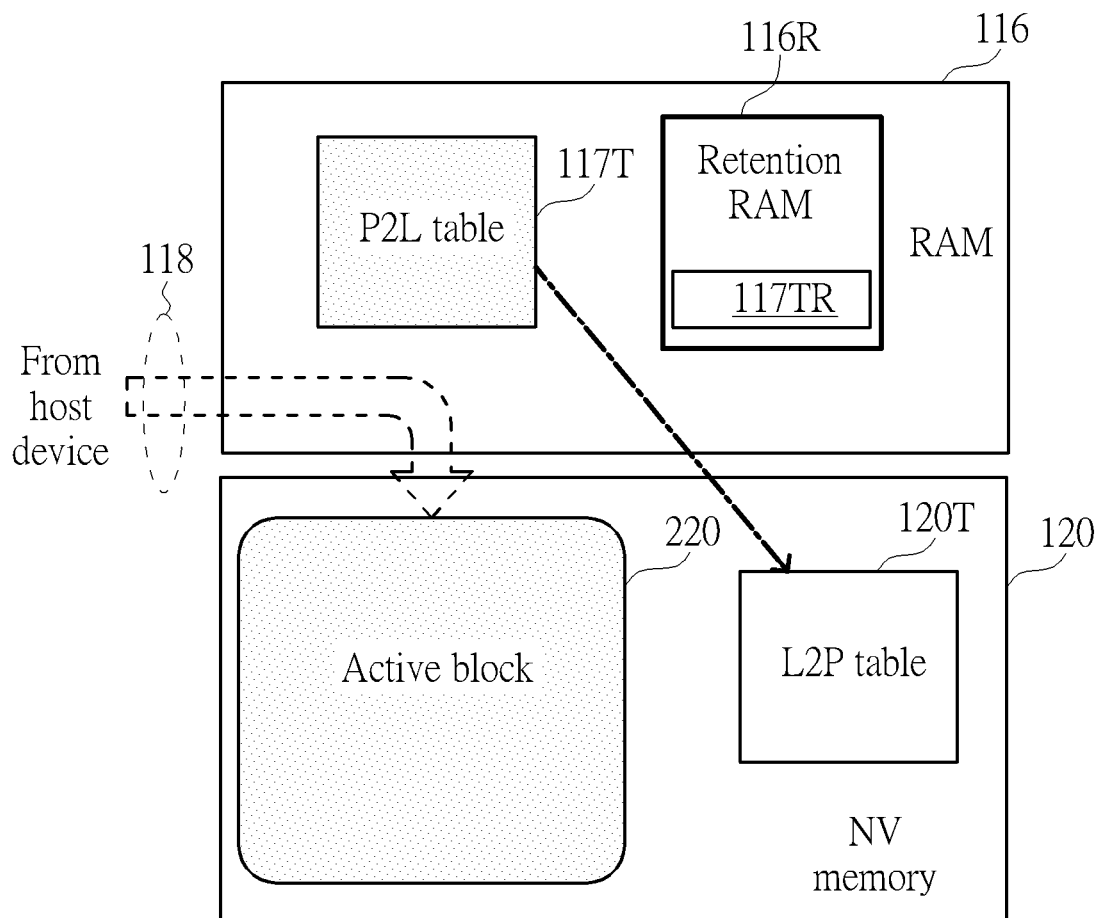
FIG. 3E illustrates yet another update operation of the data-entropy-aware table update control scheme according to the embodiment shown in FIG. 3A.

At a second subsequent time point after the second time period, there may be no command (CMD) and no data from the host device 50, and the memory controller 110 may perform the aforementioned yet another update operation as shown in FIG. 3E if the P2L entry count of the latest P2L table entries in the temporary P2L address mapping table 117T reaches the first size M1 (labeled "M1" for brevity). At the second subsequent time point, if it is detected that the P2L entry count reaches the first size M1, the memory controller 110 may update the associated L2P table entries in the L2P address mapping table 120T (labeled "L2P table" for brevity) according to the latest P2L table entries in the temporary P2L address mapping table 117T and clear the temporary P2L address mapping table 117T one time, in order to prepare for any possible state transition. For example, it is possible that there is no new command for a time period after the second subsequent time point, and entering the power saving state such as the sleep state may occur later. As the memory controller 110 may have expanded the first P2L address mapping table mentioned above from the first size M1 to the second size M2 (e.g., M2>M1), the memory controller 110 may perform the aforementioned yet another update operation as shown in FIG. 3E to prevent any possible error, no matter what operation (e.g., the aforementioned at least one first update operation as shown in FIG. 3B, or the aforementioned at least one second update operation as shown in FIG. 3D) is previously performed.

Figure 3F:
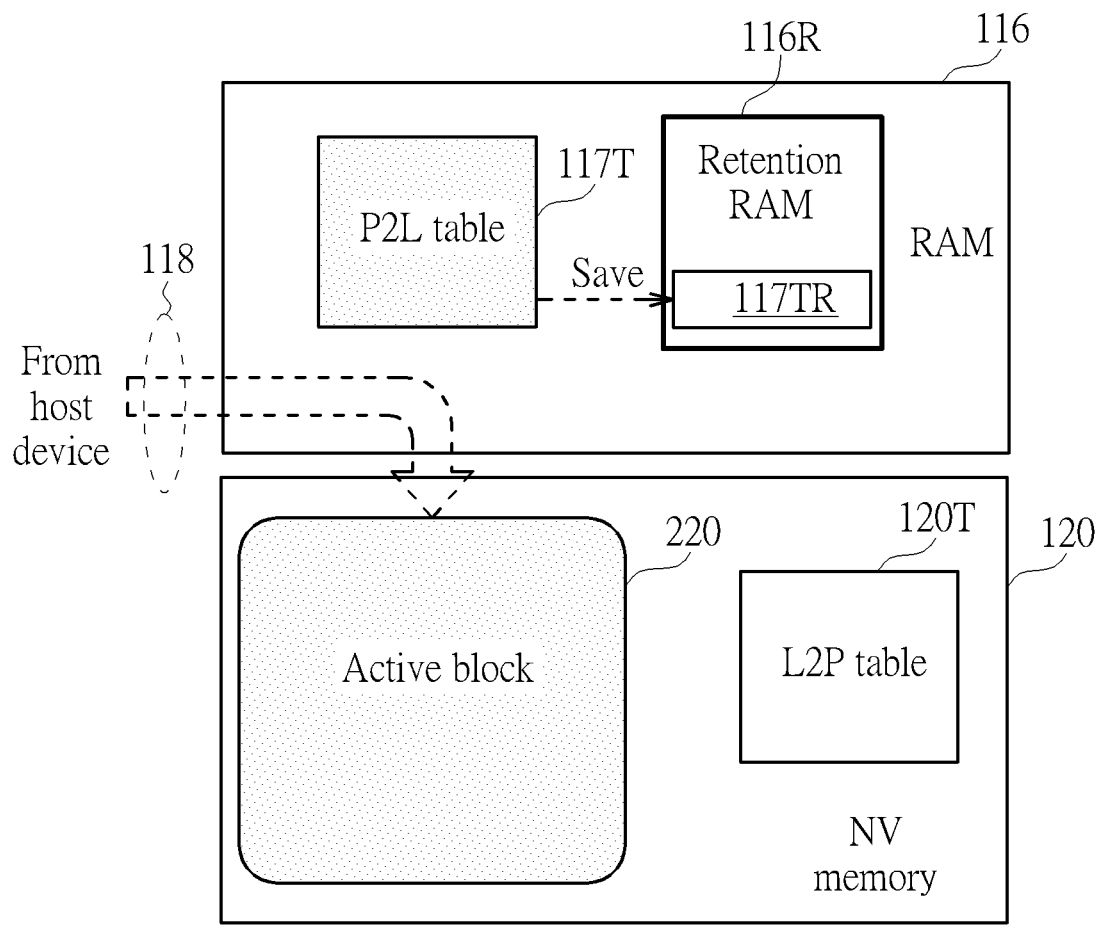
FIG. 3F illustrates a table saving operation of the data-entropy-aware table update control scheme according to the embodiment shown in FIG. 3A.

At a third subsequent time point after the second subsequent time point, there may be no command (CMD) and no data from the host device 50, and the memory controller 110 may perform the table saving operation as shown in FIG. 3F, and more particularly, save the temporary P2L address mapping table 117T (e.g., the P2L table entries therein) into the retention RAM 116R to be the P2L address mapping table 117TR (e.g., the P2L table entries therein). For example, at the third subsequent time point, the memory controller 110 may determine to enter the power saving state such as the sleep state.

According to some embodiments, the aforementioned at least one predetermined rule may be related to data classification regarding a plurality of predetermined data types, and the plurality of predetermined data types may comprise a first predetermined data type corresponding to a first predetermined entropy range and a second predetermined data type corresponding to a second predetermined entropy range, where the plurality of predetermined data types may represent data of different entropy ranges, respectively, but the present invention is not limited thereto. For example, the memory controller 110 may perform the data classification on the plurality of sets of partial data among the host-write data (e.g., the data to be written into the NV memory 120), to classify the aforementioned at least one set of first partial data (e.g., the one or more sets of first partial data) as the first predetermined data type (e.g., low entropy data such as the data with low entropy), and classify the aforementioned at least one set of second partial data (e.g., the one or more sets of second partial data) as the second predetermined data type (e.g., high entropy data such as the data with high entropy). More particularly, the first predetermined entropy range and the second predetermined entropy range may be defined by a predetermined entropy threshold Eth, and the memory controller 110 may detect that the entropy/entropies of the aforementioned at least one set of first partial data are less than the predetermined entropy threshold Eth and that the entropy/entropies of the aforementioned at least one set of second partial data are greater than the predetermined entropy threshold Eth. For example, the first predetermined entropy range may represent a first interval [0, Eth), and the second predetermined entropy range may represent a second interval [Eth, ∞), but the present invention is not limited thereto. For another example, the first predetermined entropy range may represent a first interval [0, Eth], and the second predetermined entropy range may represent a second interval (Eth, ∞). For brevity, similar descriptions for these embodiments are not repeated in detail here.

According to some embodiments, operations of the memory device 100 (or the memory controller 110 therein) may comprise:

(1) the memory device 100 (or the memory controller 110) may receive a set of first commands from the host device 50 through the transmission interface circuit 118 of the memory controller 110, receive a set of first data with the first active block such as the active block 220 according to the set of first commands, and update the temporary P2L address mapping table 117T corresponding to the active block 220, where the set of first commands may indicate that writing the set of first data into the memory device 100 is requested;

(2) the memory device 100 (or the memory controller 110) may determine the selected table update size among the multiple predetermined table update sizes according to the aforementioned at least one predetermined rule, where the multiple predetermined table update sizes may represent multiple table entry counts, respectively; and (3) the memory device 100 (or the memory controller 110) may update the aforementioned at least one L2P address mapping table such as the L2P address mapping table 120T in the NV memory 120 according to a set of P2L table entries corresponding to the selected table update size in the temporary P2L address mapping table 117T, for use of data accessing, where a table entry count of the set of P2L table entries is equal to the selected table update size;

wherein, when there is a need, the memory controller 110 may access the data such as the host-write data mentioned above (e.g., the data to be written into the NV memory 120) according to the L2P address mapping table 120T, and more particularly, read the host-write data that has been stored in the NV memory 120 according to the associated L2P table entries in the L2P address mapping table 120T for the host device 50, but the present invention is not limited thereto. According to some embodiments, the memory device 100 (or the memory controller 110 therein) may be arranged to switch among the multiple predetermined table update sizes. For example, based on the aforementioned at least one predetermined rule:

(1) in response to at least one first predetermined criterion (e.g., one or more first predetermined criteria) being met, the memory controller 110 may update the aforementioned at least one L2P address mapping table such as the L2P address mapping table 120T according to multiple sets of first P2L table entries in the temporary P2L address mapping table 117T in unit of a first predetermined table update size (e.g., the first size M1) among the multiple predetermined table update sizes; and (2) in response to at least one second predetermined criterion (e.g., one or more second predetermined criteria) being met, the memory controller 110 may update the aforementioned at least one L2P address mapping table such as the L2P address mapping table 120T according to multiple sets of second P2L table entries in the temporary P2L address mapping table 117T in unit of a second predetermined table update size (e.g., the second size M2) among the multiple predetermined table update sizes.

For brevity, similar descriptions for these embodiments are not repeated in detail here.

Figure 4:
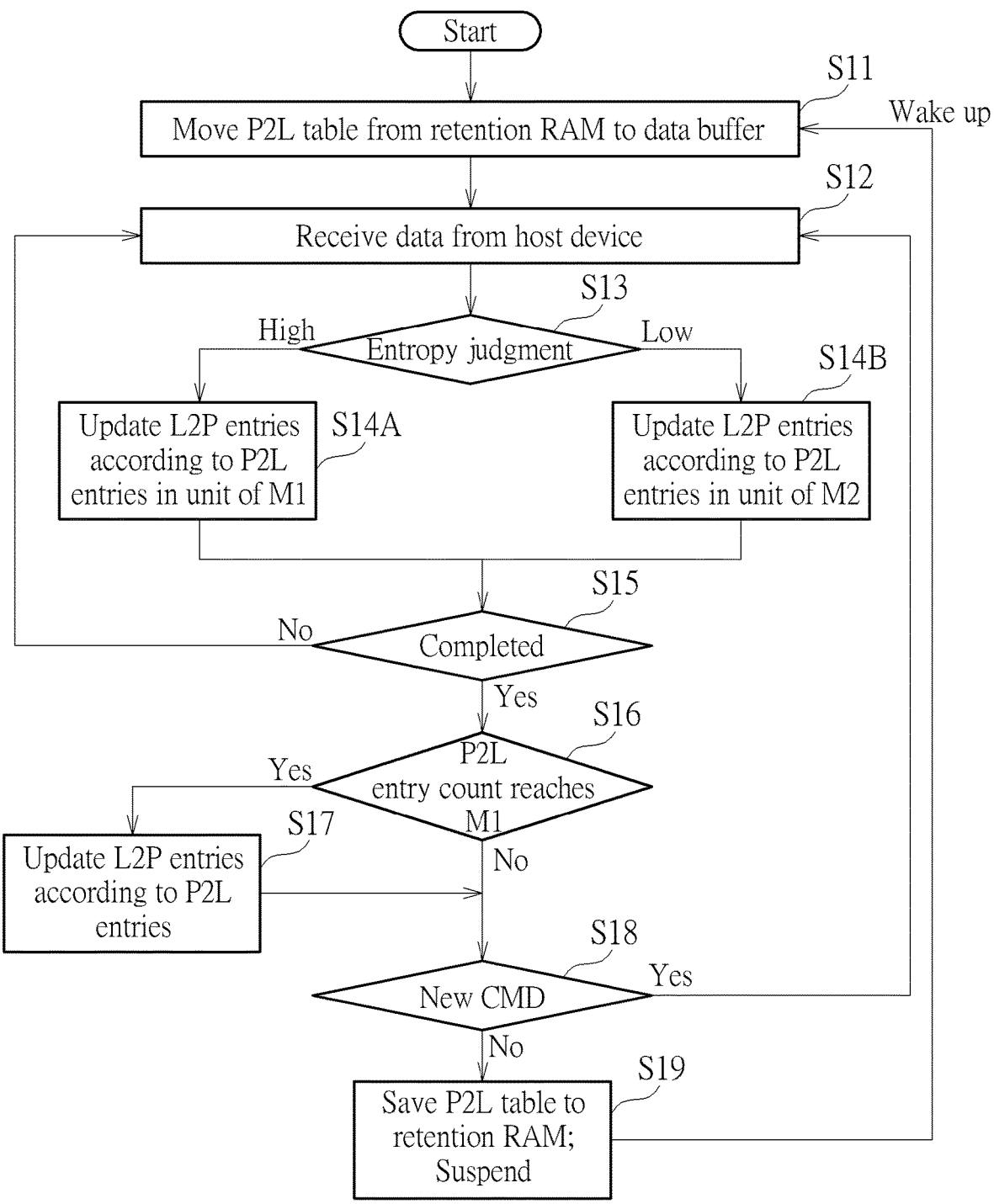
FIG. 4 illustrates a table update size control scheme of the method according to an embodiment of the present invention.

FIG. 4 illustrates a table update size control scheme of the method according to an embodiment of the present invention, where the memory device 100 (or the memory controller 110 therein) may operate according to the table update size control scheme shown in FIG. 4.

In Step S11, the memory device 100 (or the memory controller 110) may move the P2L address mapping table 117TR (e.g., the P2L table entries therein) from the retention RAM 116R to the second memory region (e.g., the non-retention memory region) such as the data buffer to be the temporary P2L address mapping table 117T (e.g., the P2L table entries therein) for performing the internal management operations mentioned above (labeled "Move P2L table from retention RAM to data buffer" for brevity).

In Step S12, the memory device 100 (or the memory controller 110) may start receiving the data such as the host-write data (e.g., the data to be written into the NV memory 120) with the first active block such as the active block 220 (labeled "Receive data from host device" for brevity), and more particularly, receive at least one set of partial data (e.g., one or more sets of partial data) among the plurality of sets of partial data, such as the set of first data, with the active block 220. As a result, the aforementioned at least one set of partial data (e.g., the set of first data) may be written into the active block 220.

In Step S13, the memory device 100 (or, the memory controller 110) may determine the selected table update size among the multiple predetermined table update sizes according to the aforementioned at least one predetermined rule, and more particularly, perform the data classification regarding the plurality of predetermined data types on the aforementioned at least one set of partial data to determine whether the aforementioned at least one set of partial data belongs to the first predetermined data type corresponding to the first predetermined entropy range or the second predetermined data type corresponding to the second predetermined entropy range (labeled "Entropy judgment" for brevity), where the selected table update size is selected from the multiple predetermined table update sizes. For better comprehension, the first predetermined data type and the second predetermined data type represent sequential data and non-sequential data, respectively, but the present invention is not limited thereto.

For example, the memory controller 110 may detect that the entropy/entropies of the aforementioned at least one set of partial data are less than the predetermined entropy threshold Eth, and classify the aforementioned at least one set of partial data as the first predetermined data type (e.g., the sequential data) such as the low entropy data (labeled "Low" for brevity). In this situation (e.g., when the memory controller 110 determines or judges that the aforementioned at least one set of partial data belongs to the first predetermined data type such as the low entropy data), Step S14B is entered. For another example, the memory controller 110 may detect that the entropy/entropies of the aforementioned at least one set of partial data are greater than the predetermined entropy threshold Eth, and classify the aforementioned at least one set of partial data as the second predetermined data type (e.g., the non-sequential data) such as the high entropy data (labeled "High" for brevity). In this situation (e.g., when the memory controller 110 determines or judges that the aforementioned at least one set of partial data belongs to the second predetermined data type such as the high entropy data), Step S14A is entered.

In Step S14A, the memory device 100 (or the memory controller 110) may update the associated L2P table entries in the L2P address mapping table 120T according to the P2L table entries in the temporary P2L address mapping table 117T in unit of the selected table update size such as the first size M1 (labeled "Update L2P entries according to P2L entries in unit of M1" for brevity), and more particularly, update a set of L2P table entries in the L2P address mapping table 120T according to a set of P2L table entries in the temporary P2L address mapping table 117T when the P2L entry count of the latest P2L table entries in the temporary P2L address mapping table 117T reaches the selected table update size such as the first size M1. For example, the operation of Step S14A may be similar to or the same as the aforementioned at least one second update operation (e.g., the one or more second update operations) as shown in FIG. 3D.

In Step S14B, the memory device 100 (or the memory controller 110) may update the associated L2P table entries in the L2P address mapping table 120T according to the P2L table entries in the temporary P2L address mapping table 117T in unit of the selected table update size such as the first size M2 (labeled "Update L2P entries according to P2L entries in unit of M2" for brevity), and more particularly, update a set of L2P table entries in the L2P address mapping table 120T according to a set of P2L table entries in the temporary P2L address mapping table 117T when the P2L entry count of the latest P2L table entries in the temporary P2L address mapping table 117T reaches the selected table update size such as the second size M2. For example, the operation of Step S14B may be similar to or the same as the aforementioned at least one first update operation (e.g., the one or more first update operations) as shown in FIG. 3B.

In Step S15, the memory device 100 (or the memory controller 110) may check whether receiving the data such as the host-write data (e.g., the data to be written into the NV memory 120) with the first active block such as the active block 220 is completed. If Yes, Step S16 is entered; if No, Step S12 is entered.

In Step S16, the memory device 100 (or the memory controller 110) may check whether the P2L entry count of the latest P2L table entries in the temporary P2L address mapping table 117T reaches the first size M1 (labeled "P2L entry count reaches M1" for brevity). If Yes, Step S17 is entered; if No, Step S18 is entered.

In Step S17, the memory device 100 (or the memory controller 110) may update the associated L2P table entries in the L2P address mapping table 120T according to the latest P2L table entries in the temporary P2L address mapping table 117T and clear the temporary P2L address mapping table 117T one time (labeled "Update L2P entries according to P2L entries" for brevity), in order to prepare for any possible state transition. For example, the operation of Step S17 may be similar to or the same as the other update operation (e.g., the aforementioned another update operation) as shown in FIG. 3C. For another example, the operation of Step S17 may be similar to or the same as the aforementioned yet another update operation as shown in FIG. 3E. As the memory controller 110 may have expanded the first P2L address mapping table mentioned above from the first size M1 to the second size M2 (e.g., M2>M1), the memory controller 110 may perform the operation of Step S17 to prepare for any possible state transition, no matter what operation (e.g., the operation of Step S14B or the operation of Step S14A) is just performed before the partial working flow comprising Steps S15-S17 is executed.

In Step S18, the memory device 100 (or the memory controller 110) may check whether there is any new command (CMD) from the host device 50, and more particularly, wait for the aforementioned any new command until a predetermined waiting time period expires. If Yes (e.g., the aforementioned any new command is received by the memory controller 110 before the predetermined waiting time period expires), Step S12 is entered; if No (e.g., no command is received by the memory controller 110 before the predetermined waiting time period expires), Step S19 is entered.

In Step S19, the memory device 100 (or the memory controller 110) may save the temporary P2L address mapping table 117T (e.g., the P2L table entries therein) into the retention RAM 116R to be the P2L address mapping table 117TR (e.g., the P2L table entries therein) and suspend to enter the power saving state such as the sleep state afterward (labeled "Save P2L table to retention RAM; Suspend" for brevity). For example, the operation of saving the temporary P2L address mapping table 117T into the retention RAM 116R as mentioned in Step S19 may be similar to or the same as the table saving operation as shown in FIG. 3F.

For example, in response to occurrence of a predetermined event, the memory device 100 (or the memory controller 110) may wake up. In this situation, Step S11 is entered to prepare for performing the internal management operations mentioned above.

For better comprehension, the method may be illustrated with the working flow shown in FIG. 4, but the present invention is not limited thereto. According to some embodiments, one or more steps may be added, deleted, or changed in the working flow shown in FIG. 4.

According to some embodiments, after the operation of Step S11 (e.g., the table loading operation as shown in FIG. 3A) is performed, the temporary P2L address mapping table 117T may be regarded as an expanded version of the P2L address mapping table 117TR. More particularly, among the multiple predetermined table update sizes (e.g., the first size M1 and the second size M2), the second predetermined table update size (e.g., the second size M2) is greater than the first predetermined table update size (e.g., the first size M1). For example, the temporary P2L address mapping table 117T may be arranged to occupy a memory region of the second predetermined table update size (e.g., the second size M2) in the RAM 116 within the memory controller 110, where the memory controller 110 may have expanded the first P2L address mapping table mentioned above from the first size M1 to the second size M2 (e.g., M2>M1). In addition, after the operation of Step S19 (e.g., the table saving operation as shown in FIG. 3F) is performed, the P2L address mapping table 117TR may be regarded as a backup version of the temporary P2L address mapping table 117T, where the backup size of backing up the temporary P2L address mapping table 117T into the retention RAM 116R may be equal to the first predetermined table update size (e.g., the first size M1) among the multiple predetermined table update sizes (e.g., the first size M1 and the second size M2). For example, the first predetermined table update size (e.g., the first size M1) may be a minimum of the multiple predetermined table update sizes (e.g., the first size M1 and the second size M2). For brevity, similar descriptions for these embodiments are not repeated in detail here.

According to some embodiments, during updating the aforementioned at least one L2P address mapping table such as the L2P address mapping table 120T in the NV memory 120 according to the set of P2L table entries corresponding to the selected table update size (e.g., the first size M1 or the second size M2) in the temporary P2L address mapping table 117T, in response to at least one predetermined criterion (e.g., one or more predetermined criteria), the memory controller 110 may update the aforementioned at least one L2P address mapping table such as the L2P address mapping table 120T according to multiple sets of P2L table entries respectively corresponding to the selected table update size in the temporary P2L address mapping table 117T in unit of the selected table update size, where the set of P2L table entries corresponding to the selected table update size is one set of P2L table entries among the multiple sets of P2L table entries. For example, the aforementioned at least one predetermined criterion may represent the aforementioned at least one first predetermined criterion for entering Step S14A, such as the criterion that the entropy/entropies of the aforementioned at least one set of partial data are greater than the predetermined entropy threshold Eth, where the memory controller 110 may update the L2P address mapping table 120T according to the multiple sets of P2L table entries such as the multiple sets of first P2L table entries in unit of the selected table update size such as the first size M1. For another example, the aforementioned at least one predetermined criterion may represent the aforementioned at least one second predetermined criterion for entering Step S14B, such as the criterion that the entropy/entropies of the aforementioned at least one set of partial data are less than the predetermined entropy threshold Eth, where the memory controller 110 may update the L2P address mapping table 120T according to the multiple sets of P2L table entries such as the multiple sets of second P2L table entries in unit of the selected table update size such as the second size M2. For brevity, similar descriptions for these embodiments are not repeated in detail here.

Figure 5:
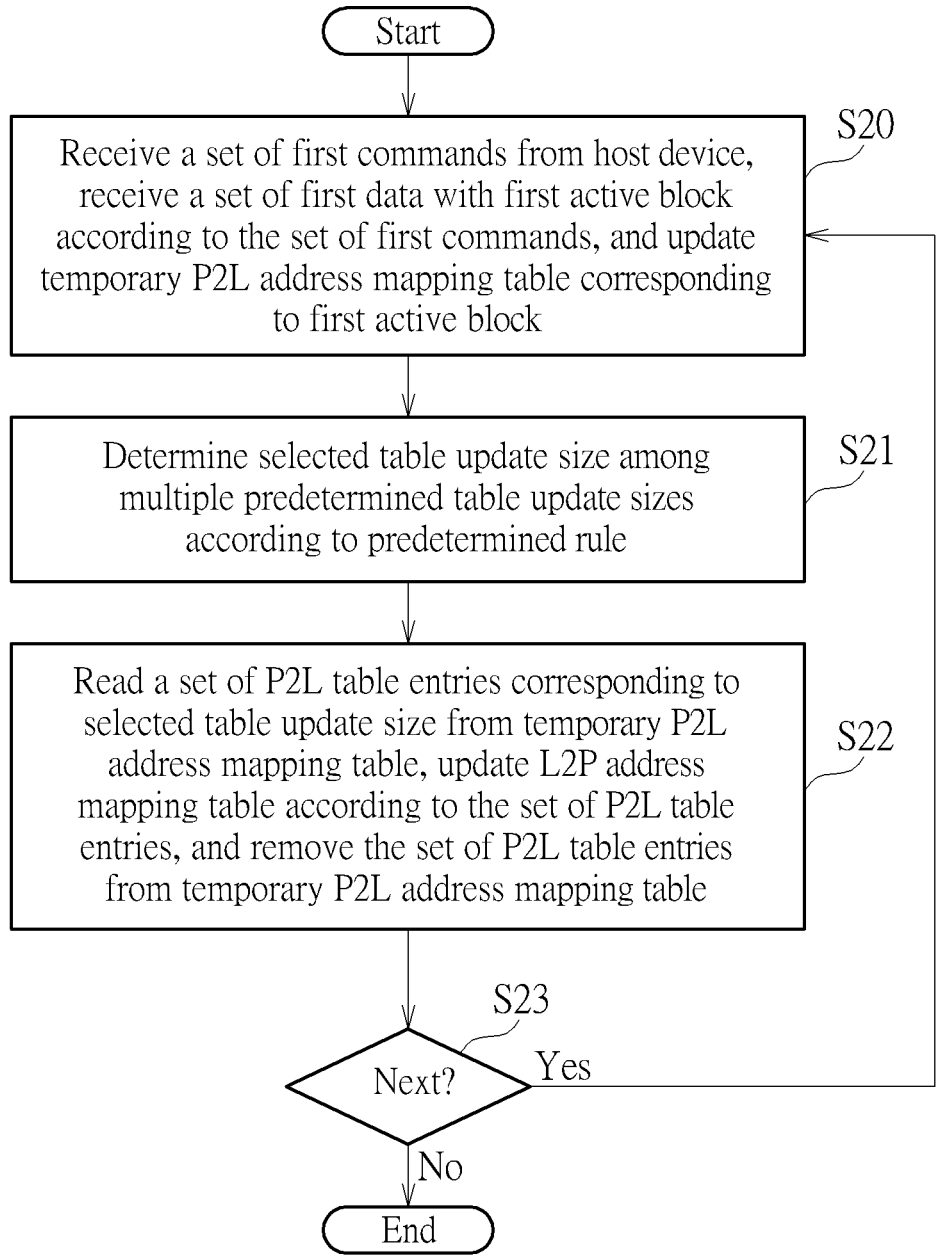
FIG. 5 illustrates a working flow of the method according to an embodiment of the present invention.

FIG. 5 illustrates a working flow of the method according to an embodiment of the present invention, where the memory device 100 (or the memory controller 110 therein) may operate according to the working flow shown in FIG. 5.

In Step S20, the memory device 100 (or the memory controller 110) may receive a set of commands such as the set of first commands from the host device 50 through the transmission interface circuit 118 of the memory controller 110, receive at least one set of partial data such as the set of first data with the first active block such as the active block 220 according to the set of commands such as the set of first commands, and update the temporary P2L address mapping table 117T corresponding to the active block 220, where the set of commands (e.g., the set of first commands) may indicate that writing the aforementioned at least one set of partial data (e.g., the set of first data) into the memory device 100 is requested. As a result, the aforementioned at least one set of partial data (e.g., the set of first data) may be written into the first active block such as the active block 220. For example, the aforementioned at least one set of partial data in the operation of Step S20 may be the same as the aforementioned at least one set of partial data in the operation of Step S12.

In Step S21, the memory device 100 (or the memory controller 110) may determine the selected table update size (e.g., the first size M1 or the second size M2) among the multiple predetermined table update sizes (e.g., the first size M1 and the second size M2) according to the aforementioned at least one predetermined rule. For example, the operation of Step S21 may be similar to or the same as the operation of Step S13, but the present invention is not limited thereto.

In Step S22, the memory device 100 (or the memory controller 110) may read a set of P2L table entries corresponding to the selected table update size (e.g., the first size M1 or the second size M2) from the temporary P2L address mapping table 117T, update the aforementioned at least one L2P address mapping table such as the L2P address mapping table 120T (e.g., a set of L2P table entries therein) according to the set of P2L table entries corresponding to the selected table update size, for use of data accessing, and remove the set of P2L table entries from the temporary P2L address mapping table 117T. For example, the memory controller 110 may have just determined that the selected table update size is equal to the first predetermined table update size (e.g., the first size M1) in Step S21. In this situation, the operation of Step S22 may be similar to or the same as the operation of Step S14A. For another example, the memory controller 110 may have just determined that the selected table update size is equal to the second predetermined table update size (e.g., the second size M2) in Step S21. In this situation, the operation of Step S22 may be similar to or the same as the operation of Step S14B.

In Step S23, the memory device 100 (or the memory controller 110) may determine whether to perform a next operation, for example, according to whether there is any new command such as the aforementioned any new command of Step S18. If Yes (e.g., the aforementioned any new command is received by the memory controller 110 before the predetermined waiting time period expires), Step S20 is entered; if No (e.g., no command is received by the memory controller 110 before the predetermined waiting time period expires), the working flow shown in FIG. 5 comes to the end. For example, the operation of Step S23 may be similar to or the same as the operation of Step S18.

For better comprehension, the method may be illustrated with the working flow shown in FIG. 5, but the present invention is not limited thereto. According to some embodiments, one or more steps may be added, deleted, or changed in the working flow shown in FIG. 5. For example, the loop comprising Steps S16 and S17 as shown in FIG. 4 may be inserted between Steps S22 and S23 in the working flow shown in FIG. 5. In addition, Steps S11 and S19 may be added to be a new beginning step and a new last step in the working flow shown in FIG. 5, to form an additional loop such as the largest loop comprising Steps S11, S19, etc. as shown in FIG. 4. For brevity, similar descriptions for these embodiments are not repeated in detail here.

According to some embodiments, any command among the set of first commands may carry first information related to any data to be written. More particularly, the aforementioned any data may comprise first data corresponding to the aforementioned any command among the set of first data mentioned above. As the set of first commands may indicate that writing the set of first data into the memory device 100 is requested, the aforementioned any command may indicate that writing the first data into the memory device is requested. For example, the first information related to the aforementioned any data (e.g., the first data) may comprise at least one first logical address for indicating at least one first logical address region, and the aforementioned any command may indicate that writing the aforementioned any data (e.g., the first data) into the aforementioned at least one first logical address region is requested. In addition, the memory device 100 (or the memory controller 110 therein) may perform a first checking operation (e.g., the operation of Step S13) on the first information to generate a first determination result (e.g., the determination result "High" of Step S13 for the first data, or the determination result "Low" of Step S13 for the first data), for determining the selected table update size, where the first determination result may indicate whether the first data belongs to a certain predetermined data type (e.g., the first predetermined data type or the second predetermined data type) among the plurality of predetermined data types. For example, the first determination result may represent the determination result "High" of Step S13 for the first data, indicating that the first data belongs to the second predetermined data type such as the high entropy data. In this situation, in response to the first determination result (e.g., the determination result "High" of Step S13 for the first data), the memory controller 110 may determine that the selected table update size is equal to the first predetermined table update size (e.g., the first size M1). For another example, the first determination result may represent the determination result "Low" of Step S13 for the first data, indicating that the first data belongs to the first predetermined data type such as the low entropy data. In this situation, in response to the first determination result (e.g., the determination result "Low" of Step S13 for the first data), the memory controller 110 may determine that the selected table update size is equal to the second predetermined table update size (e.g., the second size M2). Additionally, the memory controller 110 may be arranged to generate the first determination result according to the aforementioned at least one first logical address, but the present invention is not limited thereto. According to some embodiments, the first information may further comprise a first data length of the first data, and the memory controller 110 may be arranged to generate the first determination result according to the first data length. For brevity, similar descriptions for these embodiments are not repeated in detail here.

According to some embodiments, the memory controller 110 may record a null entry having a default value (e.g., a predetermined value that does not indicate any mapping information) in the first P2L address mapping table (e.g., the P2L address mapping table 117TR or the temporary P2L address mapping table 117T) to be a cleared entry, for indicating that the location where the null entry is recorded has been cleared for further use, where the memory controller 110 may record a new entry at this location later when there is a need, but the present invention is not limited thereto. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access management of a memory device in a predetermined communications architecture with aid of unbalanced table update size, the method being applied to a memory controller of the memory device, the memory device comprising the memory controller and a non-volatile (NV) memory, the NV memory comprising at least one NV memory element, the at least one NV memory element comprising a plurality of blocks, the method comprising:

utilizing the memory controller to receive a set of first commands from a host device through a transmission interface circuit of the memory controller, receive a set of first data with a first active block among the plurality of blocks according to the set of first commands, and update a temporary physical-to-logical (P2L) address mapping table corresponding to the first active block, wherein the set of first commands indicate that writing the set of first data into the memory device is requested, and the set of first data is written into the first active block;

determining a selected table update size among multiple predetermined table update sizes according to at least one predetermined rule, wherein the multiple predetermined table update sizes represent multiple table entry counts, respectively; and updating at least one logical-to-physical (L2P) address mapping table in the NV memory according to a set of P2L table entries corresponding to the selected table update size in the temporary P2L address mapping table, for use of data accessing, wherein a table entry count of the set of P2L table entries is equal to the selected table update size.

2. The method of claim 1, wherein a backup size of backing up the temporary P2L address mapping table is equal to a first predetermined table update size among the multiple predetermined table update sizes.

3. The method of claim 2, wherein the first predetermined table update size is a minimum of the multiple predetermined table update sizes.

4. The method of claim 2, wherein a second predetermined table update size among the multiple predetermined table update sizes is greater than the first predetermined table update size; and the temporary P2L address mapping table is arranged to occupy a memory region of the second predetermined table update size in a Random Access Memory (RAM) within the memory controller.

5. The method of claim 1, wherein updating the at least one L2P address mapping table in the NV memory according to the set of P2L table entries corresponding to the selected table update size in the temporary P2L address mapping table further comprises:

in response to at least one predetermined criterion being met, updating the at least one L2P address mapping table in the NV memory according to multiple sets of P2L table entries respectively corresponding to the selected table update size in the temporary P2L address mapping table in unit of the selected table update size, wherein the set of P2L table entries is one set of P2L table entries among the multiple sets of P2L table entries.

6. The method of claim 1, wherein the memory controller is arranged to switch among the multiple predetermined table update sizes, wherein:

in response to at least one first predetermined criterion being met, the memory controller updates the at least one L2P address mapping table according to multiple sets of first P2L table entries in the temporary P2L address mapping table in unit of a first predetermined table update size among the multiple predetermined table update sizes; and in response to at least one second predetermined criterion being met, the memory controller updates the at least one L2P address mapping table according to multiple sets of second P2L table entries in the temporary P2L address mapping table in unit of a second predetermined table update size among the multiple predetermined table update sizes.

7. The method of claim 1, wherein the at least one predetermined rule is related to data classification regarding a plurality of predetermined data types; any command among the set of first commands carries first information related to any data to be written, the first information comprises at least one first logical address for indicating at least one first logical address region, and the any command indicates that writing the any data into the at least one first logical address region is requested; and the method further comprises:

performing a first checking operation on the first information to generate a first determination result, for determining the selected table update size, wherein the first determination result indicates whether the first data belongs to a predetermined data type among the plurality of predetermined data types.

8. The method of claim 7, wherein the first information further comprises a first data length of the first data, and the memory controller is arranged to generate the first determination result according to the first data length.

9. The method of claim 7, wherein the memory controller is arranged to generate the first determination result according to the at least one first logical address.

10. The method of claim 1, wherein the at least one predetermined rule is related to data classification regarding a plurality of predetermined data types, and the plurality of predetermined data types comprises a first predetermined data type and a second predetermined data type, wherein the first predetermined data type and the second predetermined data type represent sequential data and non-sequential data, respectively.

11. The method of claim 1, wherein the at least one predetermined rule is related to data classification regarding a plurality of predetermined data types, and the plurality of predetermined data types comprises a first predetermined data type corresponding to a first predetermined entropy range and a second predetermined data type corresponding to a second predetermined entropy range, wherein the plurality of predetermined data types represent data of different entropy ranges, respectively.

12. The method of claim 1, wherein updating the at least one L2P address mapping table in the NV memory according to the set of P2L table entries corresponding to the selected table update size in the temporary P2L address mapping table further comprises:

reading the set of P2L table entries corresponding to the selected table update size from the temporary P2L address mapping table;

updating a set of L2P table entries in the at least one L2P address mapping table according to the set of P2L table entries; and removing the set of P2L table entries from the temporary P2L address mapping table.

13. A memory controller of a memory device, the memory device comprising the memory controller and a non-volatile (NV) memory, the NV memory comprising at least one NV memory element, the at least one NV memory element comprising a plurality of blocks, the memory controller comprising:

a processing circuit, arranged to control the memory controller according to a plurality of host commands from a host device, to allow the host device to access the NV memory through the memory controller, wherein the processing circuit is arranged to perform data access management of the memory device in a predetermined communications architecture with aid of unbalanced table update size; and a transmission interface circuit, arranged to perform communications with the host device;

wherein:

the memory controller receives a set of first commands from the host device through the transmission interface circuit of the memory controller, receives a set of first data with a first active block among the plurality of blocks according to the set of first commands, and updates a temporary physical-to-logical (P2L) address mapping table corresponding to the first active block, wherein the set of first commands indicate that writing the set of first data into the memory device is requested, and the set of first data is written into the first active block;

the memory controller determines a selected table update size among multiple predetermined table update sizes according to at least one predetermined rule, wherein the multiple predetermined table update sizes represent multiple table entry counts, respectively; and the memory controller updates at least one logical-to-physical (L2P) address mapping table in the NV memory according to a set of P2L table entries corresponding to the selected table update size in the temporary P2L address mapping table, for use of data accessing, wherein a table entry count of the set of P2L table entries is equal to the selected table update size.

14. The memory device comprising the memory controller of claim 13, wherein the memory device comprises:

the NV memory, configured to store information; and the memory controller, coupled to the NV memory, configured to control operations of the memory device.

15. An electronic device comprising the memory device of claim 14, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

* * * * *